F. W. A. TECHMER.
PLOW.
APPLICATION FILED FEB. 2, 1910.
1,048,005.
Patented Dec. 24, 1912.
3 SHEETS—SHEET 3.
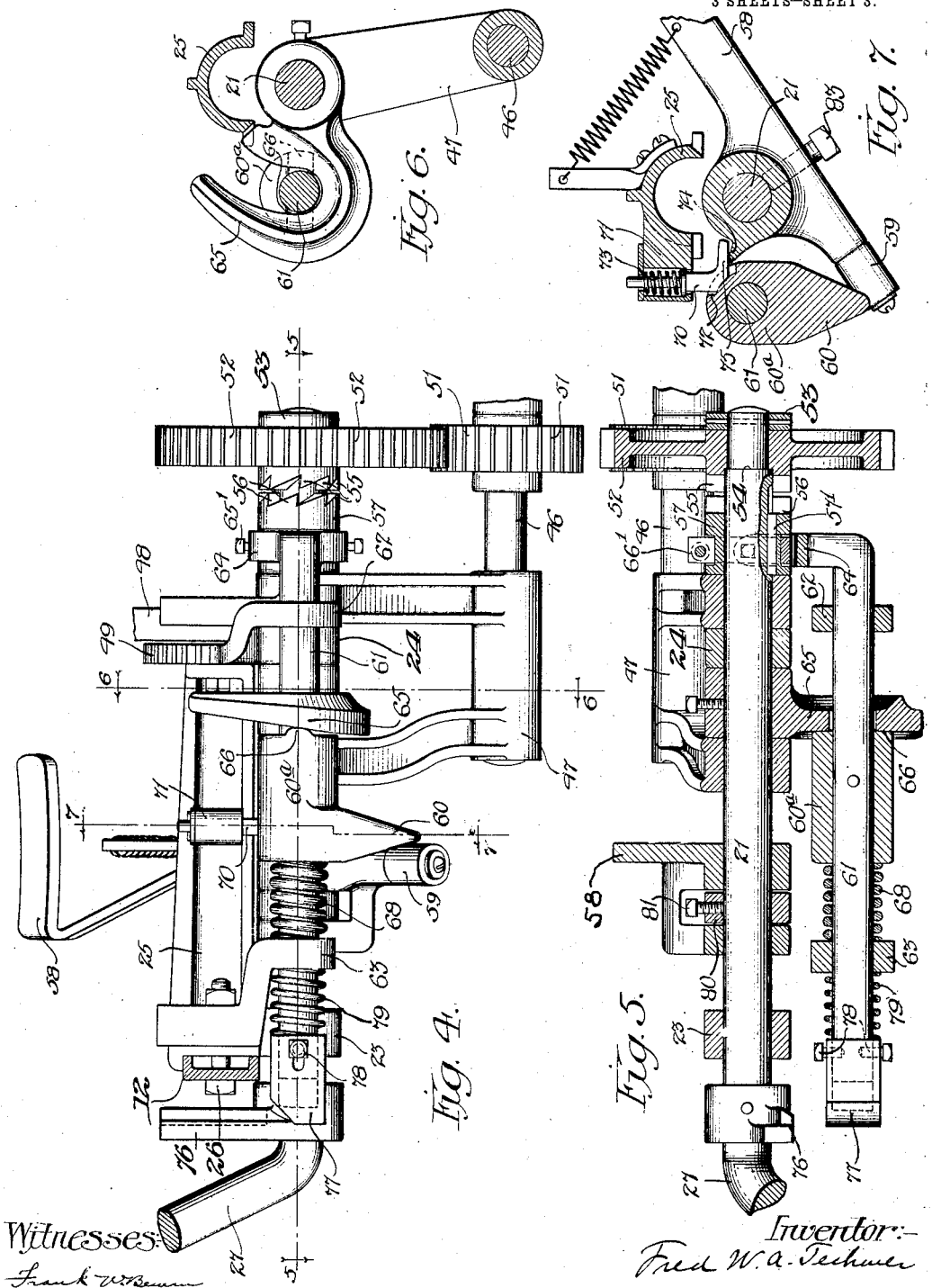
Witnesses:
Frank W. Beam
Hildur C. Petersen
Inventor:—
Fred W. A. Techmer
By: Fred Gaulach
his Atty.

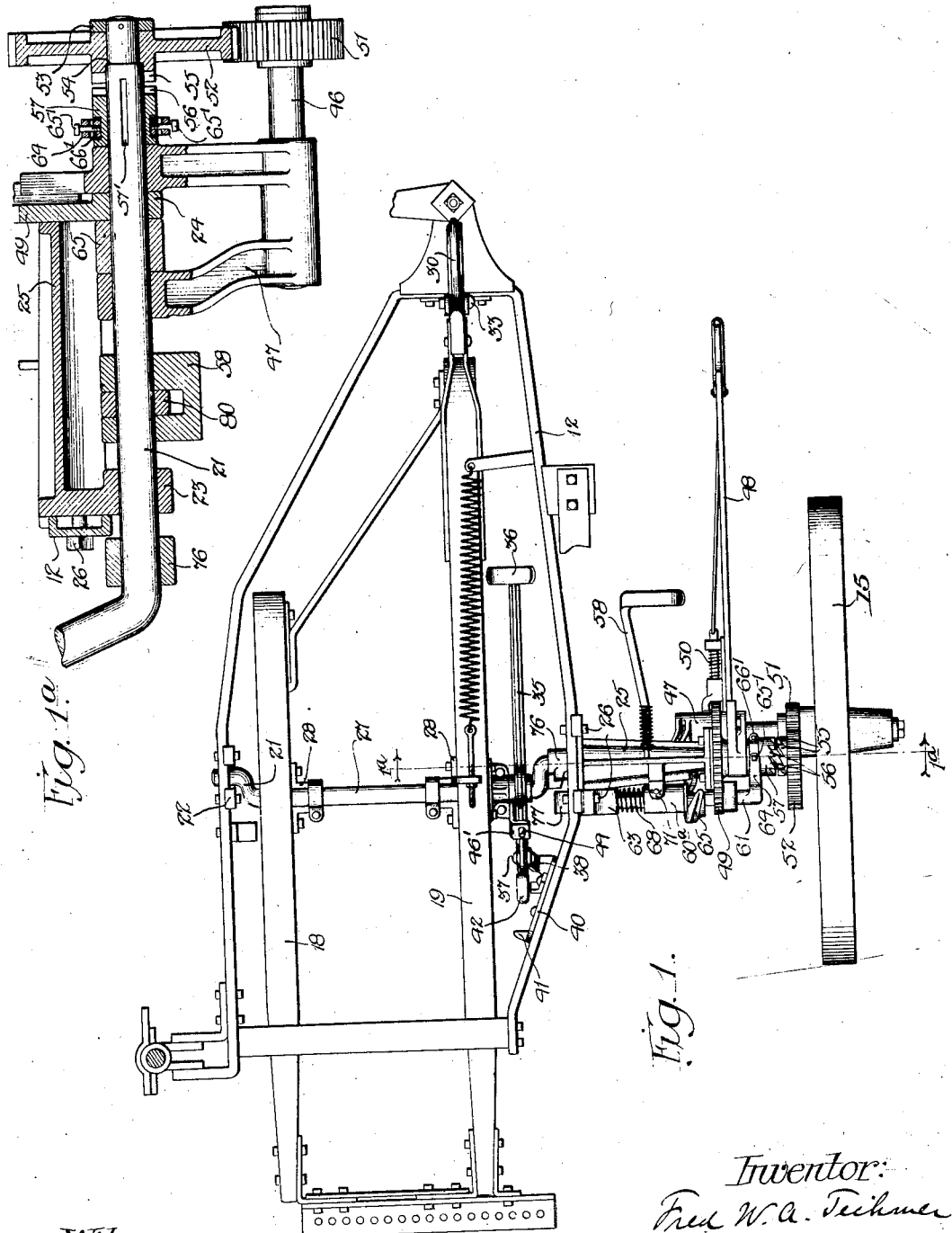

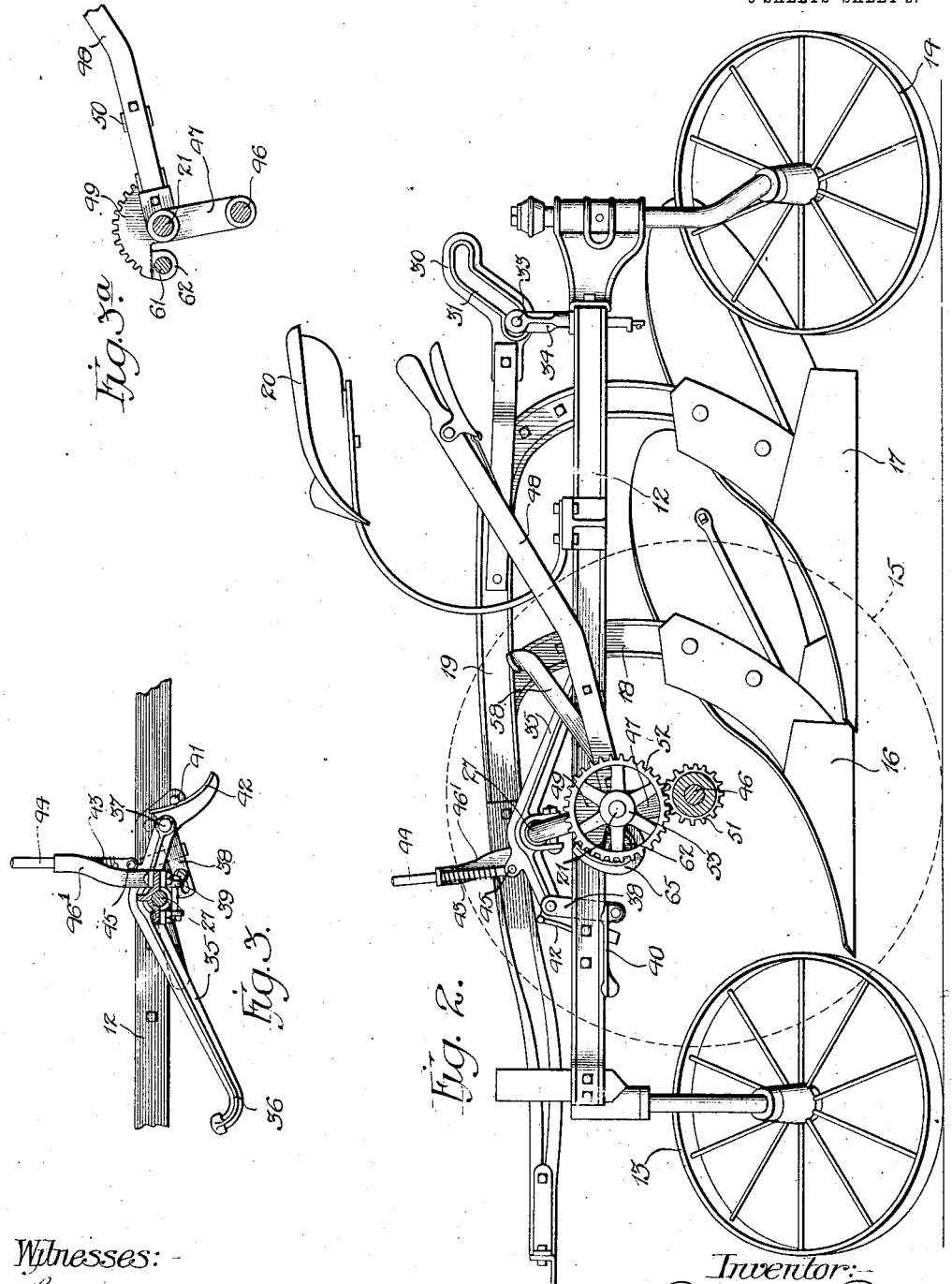

UNITED STATES PATENT OFFICE.

FRED W. A. TECHMER, OF LA CROSSE, WISCONSIN.

PLOW.

1,048,005.      Specification of Letters Patent.      Patented Dec. 24, 1912.

Application filed February 2, 1910. Serial No. 541,553.

*To all whom it may concern:*

Be it known that I, FRED W. A. TECHMER, a resident of La Crosse, in the county of La Crosse and State of Wisconsin, have invented certain new and useful Improvements in Plows, of which the following is a full, clear, and exact description.

The invention relates to plows and more particularly to the mechanism for operating the plow.

The invention designs to provide improved plow-shifting mechanism, whereby the draft of the horse is utilized to raise the plow or plows out of the soil, thus relieving the operator of such work.

The invention consists in the several novel features hereinafter set forth and more particularly defined by claims at the conclusion hereof.

In the drawings: Figure 1 is a plan view of a plow embodying the invention, the plow-shares and the furrow wheels being omitted. Fig. 1ª is a vertical section on line 1ª—1ª of Fig. 1 on a somewhat larger scale.
Fig. 2 is a side elevation, the land wheel being omitted. Fig. 3 is a detail of the plow lowering mechanism. Fig. 3ª is a detail view of the adjusting lever for the land wheel. Fig. 4 is a front view of the draft-operated lifting-mechanism and the driving mechanism therefor. Fig. 5 is a horizontal section taken on line 5—5 of Fig. 4. Fig. 6 is a section taken on line 6—6 of Fig. 4. Fig. 7 is a section taken on line 7—7 of Fig 4.

The improved plow-operating mechanism may be embodied in any type of plow and in the drawings it is illustrated as being embodied in a gang plow which comprises a suitable frame 12 sustained by a front furrow-wheel 13, a rear furrow or caster-wheel 14, and a land-wheel 15. These furrow-wheels are adjustable in the frame, as well understood in the art. Plow-shares 16 and 17 are carried by plow-beams 18 and 19, respectively, and an operator's seat 20 is provided as usual. The plow-operating mechanism comprises a shaft 21, which is journaled in a suitable bearing 22 at one side of the frame, at the land side, in bearings 23 and 24 on a bracket 25 which is secured to the frame 12 by bolts 26. This shaft 21 is connected to the plow-beams by a crank or bail 27, which extends through suitable brackets or bearings 28 which are secured to said beams. This crank serves to shift the plow-beams and plows relatively to the frame and the movement of the rear portion of the plow-beams is controlled by a bracket 30 having an angular slot 31 therein and a stud 33 on a standard 34 suitably mounted in the frame 12, extends into said angular slot, and this mechanism controls the raising and lowering of the rear portion of the plow beams as the latter are moved forwardly and downwardly in being lowered and upwardly and backwardly in being raised, so that the plows will be positioned at the desired angle for lowering and raising respectively, as well understood in the art.

The land-wheel 15 is adjustably connected to the frame, so the latter may be raised or lowered, and is mounted on a spindle 46, which is secured to the lower end of a bifurcated arm 47, which is journaled on the crank-shaft 21. A hand-lever 48 is rigidly secured to this arm 47 and is provided with a finger-controlled lock 50 adapted to engage with the teeth of rack 49, which is secured in fixed relation to the main frame and is integrally formed with the outer bearing 24 which is secured to the plow-frame by bracket 25. By adjustment of lever 48, the height of the land-side of the frame may be adjusted to vary the elevation of the plow-frame and parts carried thereby, as well understood in the art.

The plow-lowering mechanism comprises a foot-lever 35 which is journaled on the crank 27 of shaft 21 and this lever is provided with a treadle 36 at its rear end and its front end is pivotally connected, as at 37 to a link 38, which has its lower end connected by a pin and slot 39 to a bracket 40, which is secured to the main frame. A stud 41 projects inwardly from bracket 40 and a cam or curved abutment 42 on lever 35 is adapted to pass under said abutment, as shown in Fig. 3, so that when lever 35 is pushed downwardly after the link 38 has ceased to become effective, stud 41 will serve as a resistance-pin or fulcrum about which lever 35 may be swung. A spring 43 on rod 44 which is pivoted to lever 35 at 45 and slides in a bracket 46' secured to the plow-beam 19, yieldingly holds the lever 35 in proper position for operation. Any suitable means (not shown) may be employed in locking the plow in raised position, if desired.

The improved mechanism for operating the crank-shaft 21 to raise the plow out of the ground, comprises a pinion 51 which is secured to rotate with the land-wheel. This pinion meshes with a gear-wheel 52 loosely mounted on the outer end on shaft 21 (see Fig. 1). Gear-wheel 52 is held against longitudinal movement of shaft 21 by a collar 53 and a shoulder 54 and its inner face is provided with clutch-teeth 55 adapted to mesh with corresponding teeth 56 on a clutch-collar 57, which is connected by a spline 57' to rotate with said shaft. This collar is slidable longitudinally on the shaft, so that it may be brought into or out of engagement with the clutch-teeth on gear-wheel 52 and is normally disconnected from said wheel. When the clutch-collar and gear-wheel 52 are connected together and the land-wheel is passing over the ground, shaft 21 will be turned to operate crank 27 to raise the plows.

The mechanism for controlling the clutch-collar to shift it into engagement with gear-wheel 52 and to cause the plows to be raised, comprises a foot-lever 58 which is pivotally mounted on shaft 21 (Figs. 5 and 7) and is provided at its front end with a roller or abutment 59 which is adapted to engage a cam or lug 60 on a collar 60ᵃ which is secured to a controller shaft 61, to shift it longitudinally and outwardly to cause the clutch-collar 57 to engage and take power from gear-wheel 52. This controller-shaft 61, is mounted in a bearing 62 integrally formed with bearing 24 and in a lug 63 on bracket 25. The outer end of this controller-shaft is formed with a yoke 64 having studs 65' which extend into a divided ring 66' which fits in a groove in the clutch-collar 57. By shifting the controller-shaft 61 longitudinally in one direction, the clutch-collar will be shifted into engagement with gear 52 to turn crank-shaft 21 and a reverse shift of the shaft will withdraw the collar from engagement with gear-wheel 52 to disconnect the crank-shaft from the driving connection. Controller shaft 61 is operated inwardly to disconnect the clutch-collar from gear-wheel 52, by a cam 65, which is secured to turn with shaft 21 and is adapted to engage an abutment 66 on the hub of cam-collar 60ᵃ, so that when shaft 21 has been turned sufficiently to bring the plow into raised position, shaft 61 will have been shifted to withdraw the clutch-collar 57 from engagement with gear-wheel 52.

The controller-shaft 61 is normally pressed outwardly by a spring 68 disposed between bearing 63 and cam 60 to hold the clutch-collar in position to engage the clutch-teeth 55 on gear-wheel 52. To prevent this spring from shifting shaft 61 to render the clutch operative when the crank-shaft 21 is operated in lowering the plow a spring-pressed lock is provided, this lock being released during the initial movement of the foot-lever 58. This lock consists of a bolt 70 slidably mounted in a lug 71 on frame-bracket 25 and having its lower end extended to fit into a recess 72 in collar 60ᵃ. The bolt is normally pressed downwardly to pass into said seat, by a spring 73. A lug 74 on the foot-lever is adapted to engage an extension or lug 75 on a lock-bolt 70 to raise it sufficiently to withdraw it from recess 72 and to permit cam 60 and controller shaft 61 to be shifted longitudinally by spring 68, when the foot-lever 58 is depressed. When foot-lever 58 is depressed and the plows are in lowered position, said lever will initially raise bolt 70 to release controller-shaft 61 and cam 60, so that spring 68 and roller 59 during the further movement of the foot-lever, will shift the controller-shaft outwardly to cause the clutch-collar 57 to rotate with gear-wheel 52 and to be driven by the land-wheel.

In practice, it is desirable that the plows shall be locked in lowered position and for this purpose an arm 76 is rigidly secured to crank-shaft 21 and a latch 77 is slidably mounted on the inner end of controller-shaft 61 and connected thereto by a bolt and slot-connection 78. The latch is normally pressed inwardly or into operative position by a light spring 79, which permits arm 78, when the crank-shaft is operated by the plow-lowering mechanism, to be shifted beneath the latch to cause the latter to lock the arm when the plows have been lowered. When the controller-shaft 61 is shifted outwardly by foot-lever 58 and spring 68, to cause the draft-operated mechanism to raise the plows, bolt 78 will cause latch 77 to be shifted outwardly clear of arm 76 to release the latter and permit the plow-lifting mechanism to raise the plow. Lever 58 has a split hub and is positioned longitudinally on crank-shaft 21 by a collar 80 which is secured to the shaft by a set-screw 81. By adjustment of the collar, the lever may be set into proper relation with respect to cam 60. The lever is normally and yieldingly held in normal position by a spring 52. In event the draft-operated lifting-mechanism should become inoperative, it is desirable that some means should be provided whereby the driver can raise the plows. By securing lever 58 to the crank-shaft 21, for example: by set-screw 83, (Fig. 7) the depression of the lever will cause the shaft to be operated directly and independently of the draft-operated lifting mechanism.

The operation of the improved plow-shifting mechanism will be as follows: Assuming the parts to be in normal position, as shown in Fig. 2, and the plows to be in raised position, the latter may be lowered by depressing lever 35, which will cause crank 27 to turn, and lower the plows. The particular construction of plow-lowering mechanism I do not claim as my invention. In lowering the plows, arm 76 will pass beneath latch 77, so that when the plows have been lowered, they will be locked against upward movement. When the plows are in lowered position and it is desired to raise them by the draft-operated shifting mechanism, the operator will depress lever 58, which will initially, shift lock-bolt 70 to release the controller-shaft and parts secured thereto, so that spring 68 will shift said shaft outwardly and during further shift of the lever, roller 58ª will engage cam 60 and positively shift the controller-shaft outwardly to cause clutch-collar 57 to engage clutch-teeth 55 on gear-wheel 52. The outward shift of controller-shaft 61 will also operate latch 77 to release arm 76. Thereupon, pinion 51, which rotates with the land-wheel, will rotate gear-wheel 52 which will, by means of the clutch-collar 57 rotate crank-shaft 21 to operate crank 27 to raise the plows. When the shaft has been turned sufficiently to bring the plows into raised position, cam 65 will engage abutment 66 on collar 60ª and shift the controller-shaft 61 inwardly against the force of spring 68 and cause said shaft to withdraw clutch-collar 57 from engagement with gear-wheel 52. Lock-bolt 70 will then hold cam 60 and shaft 61 against outward movement until the plow has again been lowered and the lever 58 is again operated to raise the plow.

The invention thus provides draft-operated lifting mechanism for the plow which may be readily controlled and which is simple in construction and which positively controls the plow. Furthermore, the construction is such that it may be embodied in plows of standard construction without modification of a general arrangement of parts.

The invention is not to be understood as restricted to the details shown and described, since these may be modified within the scope of the appended claims, without departing from the spirit and scope of the invention.

Having thus described the invention, what I claim as new and desire to secure by Letters Patent, is:

1. In a plow, the combination of furrow-wheels and a land-wheel, a frame, a plow movably sustained by said frame, an arm on which the land-wheel is mounted, a lever for adjusting said arm, and draft-operated plow-lifting mechanism operated by the land-wheel and comprising a shaft on which said arm is mounted, a gear wheel on said shaft, and a gear mounted to rotate with the land-wheel and meshing with the gear on said shaft.

2. In a plow, the combination of carrying-wheels comprising a land-wheel, a frame, a plow, a plow-operating shaft carried by said frame, an arm for adjustably connecting the land-wheel to the frame, a lever for adjusting said arm, a gear mounted on the arm and driven by the land-wheel, a gear on said shaft and meshing with the gear on said arm, and means for controlling the operation of the shaft by said gears.

3. In a plow, the combination of carrying-wheels comprising a land-wheel, a frame, a plow, a plow-operating shaft mounted on said frame, an arm for adjustably connecting the land-wheel to the frame, a lever for adjusting said arm, a gear mounted on the arm and driven by the land-wheel, a gear on said shaft and meshing with the gear on said arm, a clutch on said shaft for driving the shaft from the gear thereon, and means for automatically disconnecting the clutch when the plow has been raised.

4. In a plow, the combination of carrying-wheels comprising a land-wheel, a frame, a plow, a plow-operating shaft carried by said frame, gear-mechanism between said shaft and the land-wheel, a clutch between the gear-mechanism and the shaft, means for locking the clutch in disengaged position, and a lever for releasing the locking-mechanism and shifting the clutch into operative position.

5. In a plow, the combination of carrying-wheels, comprising a land-wheel, a frame, a plow, a plow-operating shaft mounted on said frame, gear-mechanism between the land-wheel and said shaft, a clutch for causing said gear-mechanism to operate said shaft, controlling-means for the clutch comprising means for automatically disconnecting the clutch when the plow has been raised, a throw-in lever for the clutch, and means for locking the clutch in disconnected position, operated by said lever.

6. In a plow, the combination of carrying-wheels comprising a land-wheel, a frame, a plow, a plow-operating shaft, a lock for holding the plow in lowered position, draft-operated lifting-mechanism operated by said land-wheel comprising a plurality of gear wheels, and mechanism for controlling the operation of said shaft by said draft-operated mechanism, comprising means for automatically disconnecting the lifting-means when the plow has been raised, and a lever for rendering said lifting-means operative and for releasing said lock.

7. In a plow, the combination of carrying wheels, a frame, a plow, a plow-operating shaft, a driving connection between one of the carrying wheels and said shaft, a clutch for controlling the operation of said shaft by said connection, a lever for rendering the clutch operative, a latch for locking the shaft when the plow is lowered, means controlled by the lever for releasing the latch when the clutch is rendered operative, and means for disconnecting the clutch when the plow has been raised.

8. In a plow, the combination of carrying-wheels, a frame, a plow, a plow-operating shaft, having a crank thereon to which the plow is connected, a driving-connection between one of the carrying-wheels and said shaft, a clutch for controlling the operation of said shaft by said connection, a spring applied to hold the clutch operative, means for holding the clutch inoperative when the plow is lowered, a lever for operating the clutch to render it operative, and a cam fixed on the crank-shaft for rendering the clutch inoperative when the plow has been raised.

9. In a plow, the combination of carrying-wheels, a frame, a plow, a plow-operating shaft having a crank thereon to which the plow is connected, a driving-connection between one of the carrying-wheels and said shaft, a clutch for controlling the operation of said shaft by said connection, a spring for holding the clutch operative, a longitudinally movable shaft for operating the clutch, a lever for controlling the clutch-operating shaft to render the clutch operative, and a cam operated by the crank-shaft for disconnecting the clutch when the plow has been raised.

10. In a plow, the combination of carrying-wheels, a frame, a plow-operating shaft having a crank thereon to which the plow is connected, a driving-connection between one of the carrying-wheels and said shaft, a clutch for controlling the operation of said shaft by said connection, a lever for rendering the clutch operative, a lock for holding the clutch in released position when the plow is lowered, a foot-lever provided with means for releasing the lock and controlling the movement of the shaft to cause the clutch to become operative, and a cam secured on the crank-shaft for disengaging the clutch when the plow has been raised.

11. In a plow, the combination of carrying-wheels, a frame, a plow, a plow-operating shaft having a crank thereon to which the plow is connected, a driving-connection between one of the carrying-wheels and said shaft, a clutch for controlling the operation of said shaft by said connection, a lever for rendering the clutch operative, a longitudinally movable shaft for shifting the clutch, a cam fixed on the crank-shaft having a slot therein through which said clutch-operating shaft extends, for releasing the clutch when the plow has been raised, and a foot-lever for shifting said shaft to render the clutch operative.

12. In a plow, the combination of carrying-wheels comprising a land-wheel, a frame, a plow, a plow-operating shaft, a driving-connection between the land-wheel and said shaft, a clutch for controlling the operation of said shaft by said connection, mechanism for controlling the operation of said clutch comprising a lever and cam for rendering the clutch operative, a cam fixed on said shaft for disconnecting the clutch when the plow has been raised, a lock for holding the plow in lowered position controlled by said lever, and means for holding the clutch in disconnected position, said lever being provided with means for releasing the holding-means.

13. In a plow, the combination of carrying-wheels comprising a land-wheel, a frame, a plow, a plow-operating shaft, a driving-connection between the land-wheel and said shaft, a clutch for controlling the operation of said shaft by said connection, mechanism for controlling the operation of said clutch comprising a longitudinally movable shaft, a lever for shifting the latter shaft to render the clutch operative, a lock for securing the plow in its lowered position comprising an element operated by longitudinal movement of the clutch-controlling shaft.

14. In a plow, the combination of carrying-wheels comprising a land-wheel, a frame, a plow, a plow-operating shaft, a driving-connection between the land-wheel and said shaft, a clutch for controlling the operation of said shaft by said connection, mechanism for controlling the operation of said clutch comprising a longitudinally movable shaft, a lever and cam for shifting said shaft in one direction, and a cam fixed to the plow-operating shaft for shifting said clutch controlling shaft in the other direction.

15. In a plow, the combination of carrying-wheels comprising a land-wheel, a frame, a plow, a plow-operating shaft, a driving-connection between the land-wheels and said shaft comprising a plurality of gear wheels, a clutch for controlling the operation of said shaft by said connection, mechanism for controlling the operation of said clutch comprising a longitudinally movable shaft, locking-means for holding the plow in lowered position operated by said latter shaft, and a lever for shifting said shaft.

16. In a plow, the combination of carrying wheels, a frame, a plow, a crank-shaft for operating the plow, a driving-connection between one of the carrying-wheels and said shaft, a clutch for controlling the operation of the crank-shaft by said connection, a longitudinally movable shaft for controlling the clutch, means for locking the clutch in inoperative position, a lever for controlling said clutch, movable independently of said locking means, and means for operating the clutch-controlling shaft to disconnect the clutch when the plow has been raised.

17. In a plow, the combination of carrying-wheels, a frame, a plow, a crank-shaft for operating the plow, a driving-connection between one of the carrying-wheels and said shaft, a clutch for controlling the operation of the crank-shaft by said connection, a 13 longitudinally movable shaft for controlling the clutch, means for locking the clutch in inoperative position, a lever for operating said clutch, movable independently of said locking means, a spring for shifting said clutch-controlling shaft in position to render the clutch operative, and means for operating the clutch-controlling shaft to disconnect the clutch when the plow has been raised.

18. In a plow, the combination of carrying-wheels, a frame, a plow, a crank-shaft for operating the plow, a driving-connection between one of the carrying-wheels and said shaft, a clutch for controlling the operation of the crank-shaft by said connection, a longitudinally movable shaft for controlling the clutch, means for locking the clutch in inoperative position, a lever for operating said clutch movable independently of said locking-means, a lock for holding the plow in lowered position, operated by said clutch-controlling shaft, and means for operating the clutch-controlling shaft to disconnect the clutch when the plow has been raised.

19. In a plow, the combination, of carrying-wheels, a frame, a plow, a crank-shaft for operating the plow, a driving-connection between one of the carrying-wheels and said shaft, a clutch for controlling the operation of the crank-shaft by said connection, a longitudinally movable shaft for controlling the clutch, means for locking the clutch in inoperative position, a lever for operating said clutch, movable independently of said locking-means, a lock for holding the plow in lowered position comprising a latch carried at one end of the clutch-controlling-shaft.

20. In a plow, the combination of carrying wheels, a frame, a plow, a plow operating shaft, a driving connection operated by one of said wheels for operating said shaft to raise the plow, a clutch for controlling the operation of said shaft by said connection, a foot lever for controlling the clutch, and means for connecting the foot lever to said shaft, so that the plow may be pedally raised by the foot lever.

FRED W. A. TECHMER.

Witnesses:
 HENRY NIEBUHR,
 MARY SCHMELZER.

Copies of this patent may be obtained for five cents each, by addressing the "Commissioner of Patents, Washington, D. C."